United States Patent
Nakazumi

(10) Patent No.: US 6,304,557 B1
(45) Date of Patent: Oct. 16, 2001

(54) COMMUNICATION NETWORK CONFIGURATION DETECTING METHOD AND COMMUNICATION LINE INFORMATION TABLE CREATING METHOD

(75) Inventor: Seiji Nakazumi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/086,647

(22) Filed: May 29, 1998

Related U.S. Application Data

(62) Division of application No. 08/522,969, filed on Sep. 1, 1995, now Pat. No. 5,826,038.

(30) Foreign Application Priority Data

Sep. 1, 1994 (JP) .................................................. 6-208306

(51) Int. Cl.⁷ .................................................. H04L 12/28
(52) U.S. Cl. .................................... 370/258; 370/254
(58) Field of Search .................................... 370/201, 248, 370/245, 249, 403, 404, 405, 400, 402, 254, 255, 257, 258, 451, 452, 351

(56) References Cited

U.S. PATENT DOCUMENTS 5,590,117 * 12/1996 Iida ...................................... 370/248

* cited by examiner

Primary Examiner—Douglas Olms
Assistant Examiner—Ricardo M. Pizarro
(74) Attorney, Agent, or Firm—Helfgott & Karas P C

(57) ABSTRACT

A method of detecting the network configuration of a communication network in which a plurality of nodes are connected in a ring form, comprises the steps of; enabling a node of the plurality of nodes to store its own node identifier in a specific position of an identifier storing area of a frame, and transmitting said frame along the network in the same direction; enabling each of the plurality of nodes to store its own node identifier in the identifier storing area of said frame and again transmitting said frame in the same direction, and abandoning said frame, according to contents of said frame received from the adjacent node; and enabling each of the plurality of nodes to recognize an arrangement of the plurality of nodes on the communication network, on the basis of contents of the identifier storing area of said frame constantly transmitted and received on the communication network.

10 Claims, 17 Drawing Sheets

COMMUNICATION NETWORK

| | | SOURCE ADDRESS | DESTINATION ADDRESS |
|---|---|---|---|
| CH1 | TX SIDE | SOURCE ADDRESS | DESTINATION ADDRESS |
| CH1 | RX SIDE | SOURCE ADDRESS | DESTINATION ADDRESS |
| | TX SIDE | SOURCE ADDRESS | DESTINATION ADDRESS |
| | RX SIDE | SOURCE ADDRESS | DESTINATION ADDRESS |
| CHn | TX SIDE | SOURCE ADDRESS | DESTINATION ADDRESS |
| | RX SIDE | SOURCE ADDRESS | DESTINATION ADDRESS |

FIG. 9

| | SOURCE ADDRESS | DESTINATION ADDRESS |
|---|---|---|
| TX(E-W) | 2 | FREE |
| RX(W-E) | FREE | 2 |

| | | |
|---|---|---|
| TX(E-W) | 2 | 3 |
| RX(W-E) | 3 | 2 |

FIG. 14A
```
NODE 1:
E-SIDE
① SOURCE ID RELATING TO E-W LINE IS PICKED UP FROME E-W SOURCE
   FRAME AND REGISTERED IN TABLE
② E-SIDE IS DROP-SET OR CROSS-CONNECTED.
   E-W LINE RECOGNIZES THAT THEN-TARGETED NODE IS A DESTINATION,
   AND THEREFORE REGISTERS NODE ID OF TARGETED NODE IN TABLE
   WHILE STORING IT IN E-W DESTINATION FRAME
W-SIDE
① NOT CROSS-CONNECTED. NO PROCESS IS THUS CONDUCTED
```

FIG. 14B
```
NODE 2:
E-SIDE
① NOT CROSS-CONNECTED. NO PROCESS IS THUS CONDUCTED.
W-SIDE
① ADDED AT THEN-TARGETED NODE RESPONSIVE TO CROSS-CONNECTION
   INFORMATION. THEN-TARGETED NODE ID IS REGISTERED AS SOURCE ID
   OF E-W AND STORED IN RELATED CHANNEL SECTION OF E-W SOURCE FRAME.
② ID IN DESTINATION FRAME RECEIVED FROM MATE NODE IS READ OUT
   AND REGISTERED AS DESTINATION ID.
```

FIG. 14C
```
NODE 3:
E-SIDE
① SOURCE ID OF E-W LINE IS PICKED UP FROM E-W SOURCE FRAME
   AND REGISTERED IN TABLE
② E-SIDE IS DROP-SET OR CROSS-CONNECTED.
   E-W LINE FINDS THAT THEN-TARGETED NODE IS A DESTINATION, AND
   THEREFORE REGISTERS NODE ID OF TARGETED NODE IN TABLE WHILE
   STORING IT IN E-W DESTINATION FRAME.
W-SIDE
① W-SIDE IS ADD-SET OR CROSS-CONNECTED.
   E-W LINE FINDS THAT TEHN-TARGETED NODE IS A DESTINATION, AND
   REGISTERS NODE ID OF THEN-TARGETED NODE IN TABLE WHILE STORING
   IT IN E-W SOURCE FRAME.
② ID IS PICKED UP FROM E-W DESTINATION FRAME AND REGISTERED
   AS DESTINATION ID.
```

FIG. 14D
```
NODE 4:
E-SIDE
① SOURCE ID OF E-W LINE IS PICKED UP FROM E-W SOURCE FRAME AND
   REGISTERED IN TABLE.
   E-W LINE IS THROUGH-SET OR CROSS-CONNECTED.
   E-W SOURCE FRAME IS THUS RELAYED.
② E-W LINE IS THROUGH-SET OR CROSS-CONNECTED.
   E-W DESTINATION ID IS THUS REGISTERED FROM E-W DESTINATION
   FRAME ONLY RELAYED.
W-SIDE
① E-W LINE IS THROUGH-SET OR CROSS-CONNECTED. SOURCE ID OF E-W
   LINE IS THUS PICKED UP FROM E-W SOURCE FRAME AND REGISTERED
   IN TABLE.
② ID IS PICKED UP FROM E-W DESTINATION FRAME AND REGISTERED AS
   DESTINATION ID. E-W LINE IS THROUGH-SET OR CROSS-CONNECTED.
   E-W DESTINATION FRAME IS THUS ONLY RELAYED.
```

COMMUNICATION NETWORK CONFIGURATION DETECTING METHOD AND COMMUNICATION LINE INFORMATION TABLE CREATING METHOD

This application is a division of Ser. No. 08/522,969, filed Sep. 1, 1995 now U.S. Pat. No. 5,826,038.

BACKGROUND OF THE INVENTION

1. Field of the Invention

The present invention relates to a method of detecting the configuration of a communication network and, more particularly, a method of detecting the arrangement of nodes in the communication network and a method of automatically creating a communication line information table on which a source node and a destination node for each channel in the communication network are set.

2. Description of the Related Art

Generally, node arrangement information in a communication network is prepared as a topology table at each of the nodes which form the communication network. In addition, communication line information, which represents source and destination nodes set in a channel, is also prepared as a communication line information table at each of the nodes. Conventionally, however, the contents of the topology and communication line information tables are set and managed manually. When the contents of the topology table and communication line information table do not coincide with the real node arrangement and the real line configuration in the network, it is quite difficult to find or detect these inconsistencies.

SUMMARY OF THE INVENTION

The present invention is therefore intended to eliminate the above-mentioned drawback.

Accordingly, the object of the present invention is to provide a method of automatically detecting the arrangement of nodes which form a communication network, and a method of automatically creating the above-mentioned communication line information table.

A method according to the present invention is for detecting the network configuration of a communication network in which a plural of nodes are connected to one another in a ring form. According to this method, each of the plurality of nodes stores an identifier of its own in a specific position of a frame and transmits the frame along the network in the a same direction.

When a node receives a frame in which an identifier indicating the node is already stored from the adjacent node, each of the plurality of nodes sends the frame in the same direction without storing its own node identifier. When the identifier is not stored in the frame received from the adjacent node and the node number indicated by the identifier stored at the specific position of the frame is larger than that of the node, each of the plurality of nodes abandons the frame. When the node number, indicated by the identifier stored at the specific position of the frame, is smaller than that of the node, each of the plurality of nodes stores its own node identifier at the next position of the specific position of the frame, and again sends the frame in the same direction.

When the above-mentioned steps are repeated, identifiers of the nodes on the communication network are stored in proper order in the frame which has gone around the communication network at least once. Each of the plurality of nodes can confirm the arrangement of the nodes on the communication network on the basis of the arrangement of the identifiers stored in the frame.

When a node receives a frame, in which an identifier indicating the node is not stored, from the adjacent node and the node number indicated by the identifier stored at the specific position of the frame is smaller than that of the node, each of the plurality of nodes may abandon the frame. When the node number indicated by the identifier is larger than that of the node, each of the plurality of nodes may store its own node identifier at the next position of the specific position of the frame.

Another method according to the present invention is for creating a line information table representing a source node and a destination node of a line in the communication network which includes a plurality of nodes. The method includes steps of causing the source node to store a source address indicating the source node at a source address field of a frame; causing the source node to send the frame to a destination node of the line; causing the destination node to store a destination address indicating the destination node at a destination address field of the frame; and causing the destination node to send the frame to the source node. When the address stored at the source address field of the received frame is identical to that of the source node, the source node creates the line information table on the basis of addresses stored in the frame. Any other nodes on the line can receive the frame and create the line information table on the basis of the addresses stored in the frame.

The source node stores its own node address in a source address field of the frame received from the other node to form a frame to be transmitted, and when the address stored in the source address field of the received frame is different from the address stored in the source address field of the frame to be transmitted, the source node may send the frame to the other node. When the addresses are the same, the source node may create the line information table on the basis of the addresses in the frame.

BRIEF DESCRIPTION OF THE DRAWINGS

FIG. 9 shows how source and destination addresses are stored in source and destination frames;

FIGS. 14A–14D show the line information table creating process at each node in FIG. 13;

DETAILED DESCRIPTION OF THE PREFERRED EMBODIMENTS

A first embodiment according to the present invention will be described, referring to FIGS. 1 through 6. The embodiment is intended to detect the arrangement of nodes in a communication network in which a plurality of nodes are connected to one another in a ring form.

Figure 1:
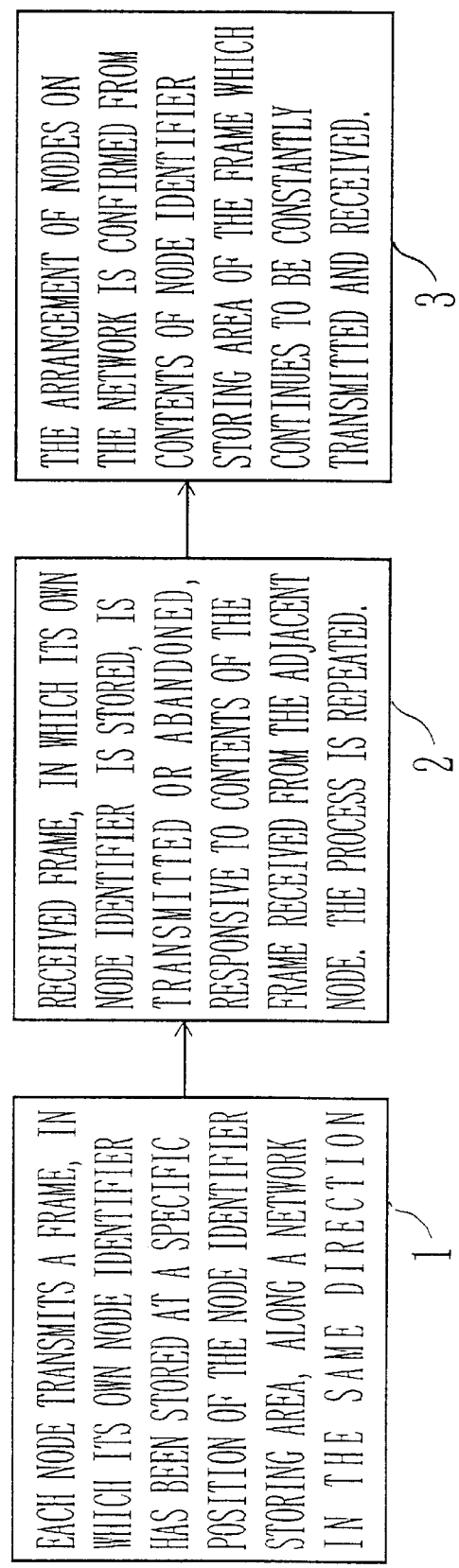
FIG. 1 is a block diagram showing the communication network configuration detecting method according to a first embodiment of the present invention.

FIG. 1 is a block diagram showing a communication network configuration detecting method according to the first embodiment of the present invention. According to the method, each of the plurality of nodes which form the communication network stores an identifier indicating said each node in a specific portion, for example a leading portion, of the identifier storing area of a frame, and sends the frame along a clockwise direction, as shown in block 1 in FIG. 1. All of the plurality of nodes send frames in the same direction in the network.

As shown in block 2 in FIG. 1, each of the plurality of nodes stores its own identifier in the node identifier storing area of the frame received from the adjacent node and again sends the frame in the same direction, or abandons the received frame, according to the contents of the received frame. This process shown in block 2 is repeated and the arrangement of nodes on the communication network is detected from the contents of the node identifier storing areas of frames which continue to be constantly transmitted and received, as shown in block 3 in FIG. 1.

In the process shown in block 2, when each of the nodes receives the frame from the left-adjacent node and an identifier indicating the node receiving the node is not stored in the received frame, each node decides whether or not the node number, indicated by an identifier stored in the leading portion of the identifier storing area of the received frame, is larger than a node number of itself. When the node number in the leading portion is larger than the node number of itself, the node abandons the received frame. When the node number of the identifier stored in the leading portion is smaller than the node number of itself, however, each node stores its own identifier at the next portion of a portion in which identifiers are already stored, that is, at the front portion of the identifier storing area in which no identifier is stored. Thereafter, each node again sends the frame along the clockwise direction.

When this process is repeated at every node, a frame, in which the smallest identifier is stored at the front of the identifier storing areas, is constantly transmitted and received through the network. From the contents of this frame, each node creates a ring topology table which shows an accurate arrangement of nodes.

Figure 2:
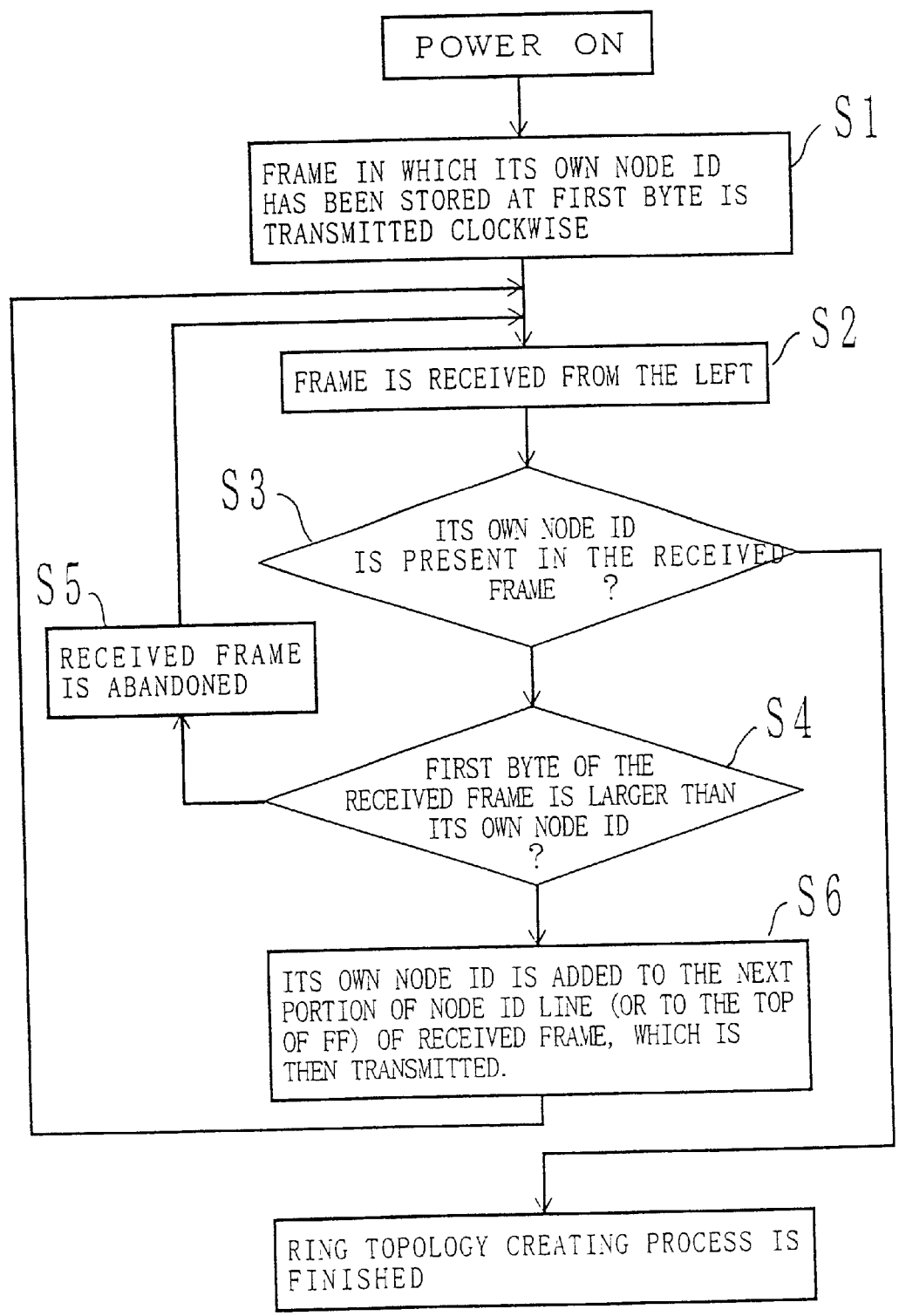
FIG. 2 is a flow chart showing a ring topology table creating process in the first embodiment.

The network configuration detecting method according to this embodiment of the present invention will be described in detail. FIG. 2 is a flow chart showing the process of creating the ring topology table.

When the process is started by putting the power on or resetting the process, each node stores its own identifier at the first byte which is at the front of the identifier storing area of a frame, and also stores "FF", which represents that no identifier is stored, at other bytes, and then transmits the frame along the clockwise direction in the network or in the right direction (step S1). Each node then receives the frame from the left (step S2) and decides whether or not its own node identifier is already stored in the received frame (step S3). When its own node identifier is not stored at the first byte of the received frame (step S3, NO), it decides whether or not an identifier stored at the first byte is larger than its own node identifier (step S4). When the identifier already stored is larger than its own node identifier (step S4, YES), the node abandons the received frame (step S5) and the process returns to step S2. When the identifier already stored is smaller than its own identifier (step S4, NO), the node stores its own node identifier at a byte next to the byte at which the identifier is already stored (or at the front one of those bytes at which FFs are already stored) in the identifier storing area of the frame received, and then sends the frame in the right direction (step S6). The process then returns to step S2.

When its own node identifier is stored in the received frame (step S3, YES), this means that the frame has gone around the network, and the ring topology table creating process is therefore finished. As apparent from the above, the frame which has rounded the network includes address and arrangement information of all nodes on the network. Even after the ring topology table creating process is finished, this frame is transmitted and received by each node while going round the network.

Figure 3:
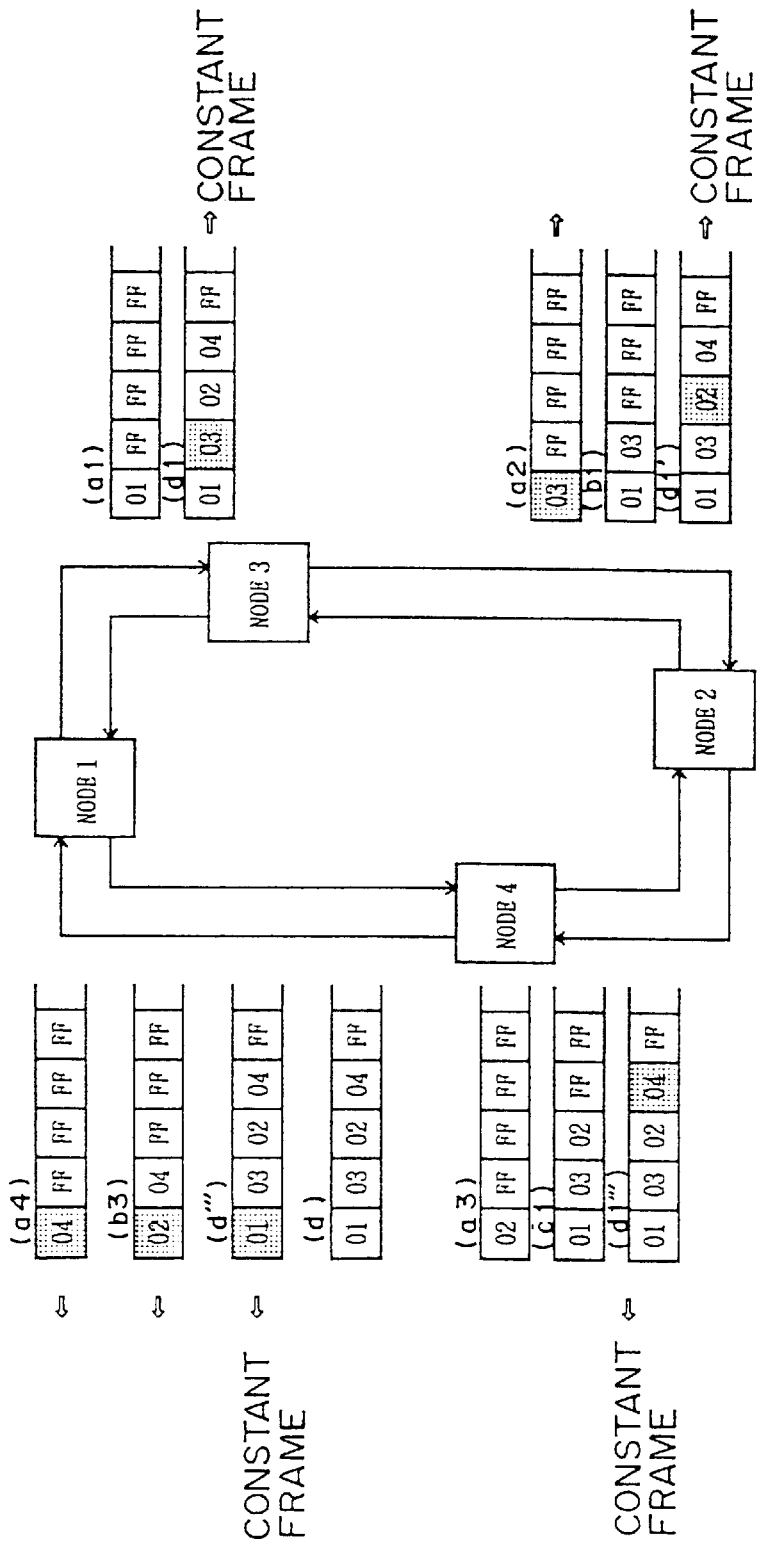
FIG. 3 shows the ring topology table creating process in more detail.

FIG. 3 shows the ring topology table creating process in more detail. As shown in FIG. 3, nodes 1 through 4 connected in ring form transmit frames, each of which includes an identifier indicating one of the nodes at the first bytes, (a1 through a4) to their next frames clockwise in the network. "FF", for example, are stored this time at the other bytes in each frame.

Nodes 1–4, which have received the frames, abandon the received frames when identifiers stored at the first bytes in the received frames are larger than their own node identifiers (frames a2 and a4 are abandoned by node 2). When identifiers already stored at the first bytes are smaller than their own node identifiers, they store their own node identifiers at bytes (b1 and b3) next to the bytes at which identifiers have been stored in the identifier storing areas of the received frames, and send the frames in the right direction. This frame-abandoning and identifier-adding process is repeated at every frame.

Node 3 stores its own node identifier "03" at the second byte of the frame a1 received from node 1 and sends the frame to node 2. Thereafter, the frame travels through nodes 2, 4 and 1 and then returns to node 3. As seen in frame d1, identifiers of these nodes are arranged this time in the correct order in the frame. Since the identifier indicating node 3 is ordered in frame d1, node 3 recognizes that frame d1 is a constant frame which is constantly transmitted and received along the communication line and the node confirms the contents of a ring topology table on the basis of the contents of the identifier storing area of the frame.

Node 2 abandons frame a2 received from the adjacent node 3 because an identifier at the first byte in frame a2 is larger than the identifier of node 2. Node 2 adds its own node identifier "02" to the third byte of frame b1 which is received from node 1 through node 3, including the identifiers of "01" and "03" at the second and the third bytes, and sends this frame (frame c1) to the node 4. After node 4 stores its own node identifier "04" at the fourth byte of this frame, the frame travels, as a constant frame, through nodes 1 and 3 and again returns to node 2 (d1'). Node 2 confirms the ring topology table set on the basis of the contents those in this frame d1'.

Node 4 receives from node 2 frame a3 in which "02" has been stored at the first byte, and stores its own node identifier "04" at the second byte in frame a3. Node 4 stores its own node identifier "04" at the fourth byte of c1 which has been received from node 2 and includes identifiers of "01", "03" and "02" at the first, second and third bytes, respectively, and then sends these frames to node 1. The node recognizes the contents of the ring topology table frame d1' which includes "01" at the first byte and has returned through the nodes 1, 3 and 2.

Node 1 abandons both frame a4, which started from node 4 and includes "04", at the first byte, and frame b3, which started from node 2 and includes "02" and "04" at the first and second bytes, respectively. Then, node 1 recognizes the contents of the ring topology table by frame d1''' which started from node 1 and rounded the network.

According to the ring topology table creating process, only frame d, in which the smallest identifier "01" is stored at the first byte, is left as a constant frame which is constantly transmitted and received in the network, and only frame d continues to round the network. From the contents of this frame, each node recognizes the arrangement and address of all nodes on the network.

Although frames are transmitted clockwise in the network in this example, they may be transmitted counter-clockwise. When they are transmitted counter-clockwise, the counter-clockwise arrangement of nodes can also be recognized. The correctness of the ring topology table can be checked by the comparison between the counter-clockwise arrangement and the clockwise arrangement.

Although only the frame, in which the identifier of the smallest node has been stored at the first byte, is left in this example, it may be arranged that the received frame is abandoned when the identifier at the first byte of the received frame is smaller than its own node identifier and that only the frame, in which the largest node identifier is stored at the first byte, is left as a constant frame.

According to the above-described ring topology table creating process, only the frame, in which the smallest identifier is stored at the first byte, is left to constantly go around the network. When two nodes each having the smallest identifier are present in the network, it becomes impossible to create a ring topology table which shows the correct arrangement of nodes because two constant frames are created. According to this embodiment of the present invention, however, the process of detecting duplicated amplifiers can be attained to check whether or not this plurality of constant frames is present in the network.

Figure 4:
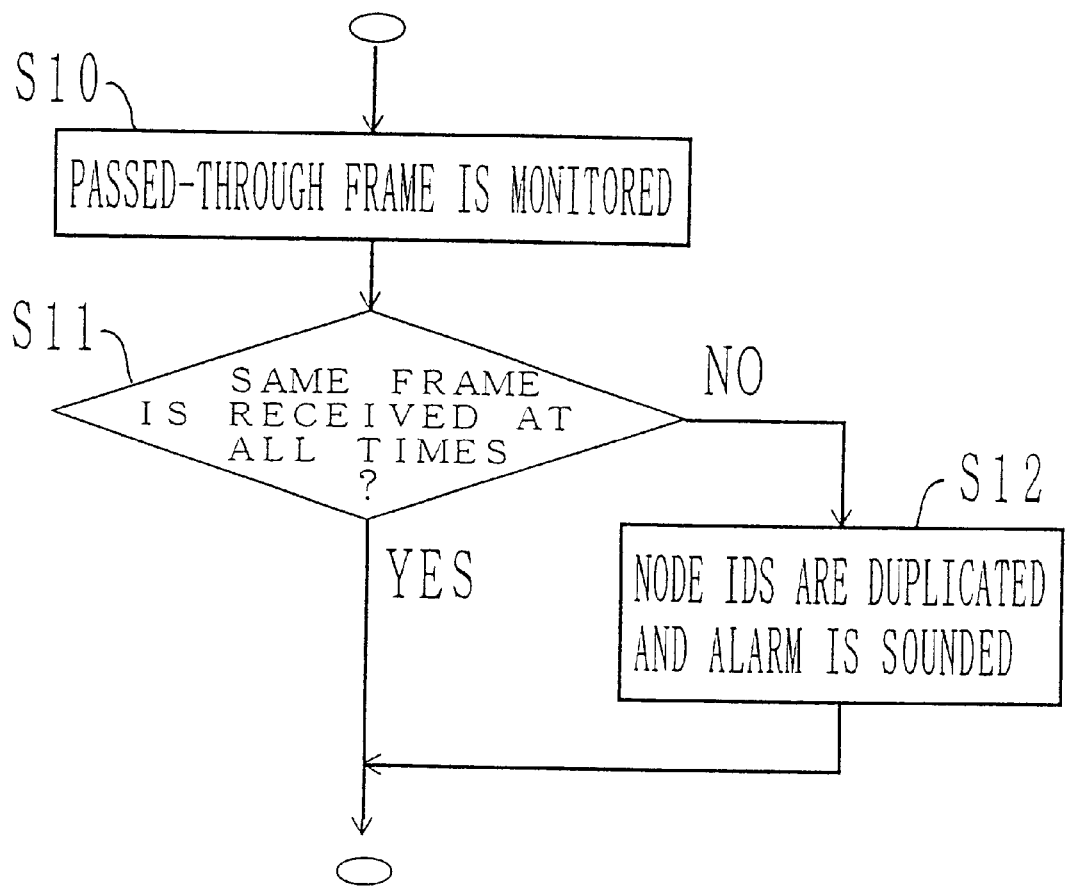
FIG. 4 is a flow chart showing an identifier duplication detecting process in the first embodiment.

FIG. 4 is a flow chart showing the identifier duplication detecting process. When the process is started, each node constantly monitors frames received by and passed through the node (step S10) to find whether or not the same frame is constantly received (step S11). When the same frame is constantly received (step S10, YES), each node performs nothing and the process is finished. When different frames are present (step S10, NO), however, an alarm is issued (step S12), to indicate that duplicated identifiers are present in the network, and the process is then finished.

Figure 5:
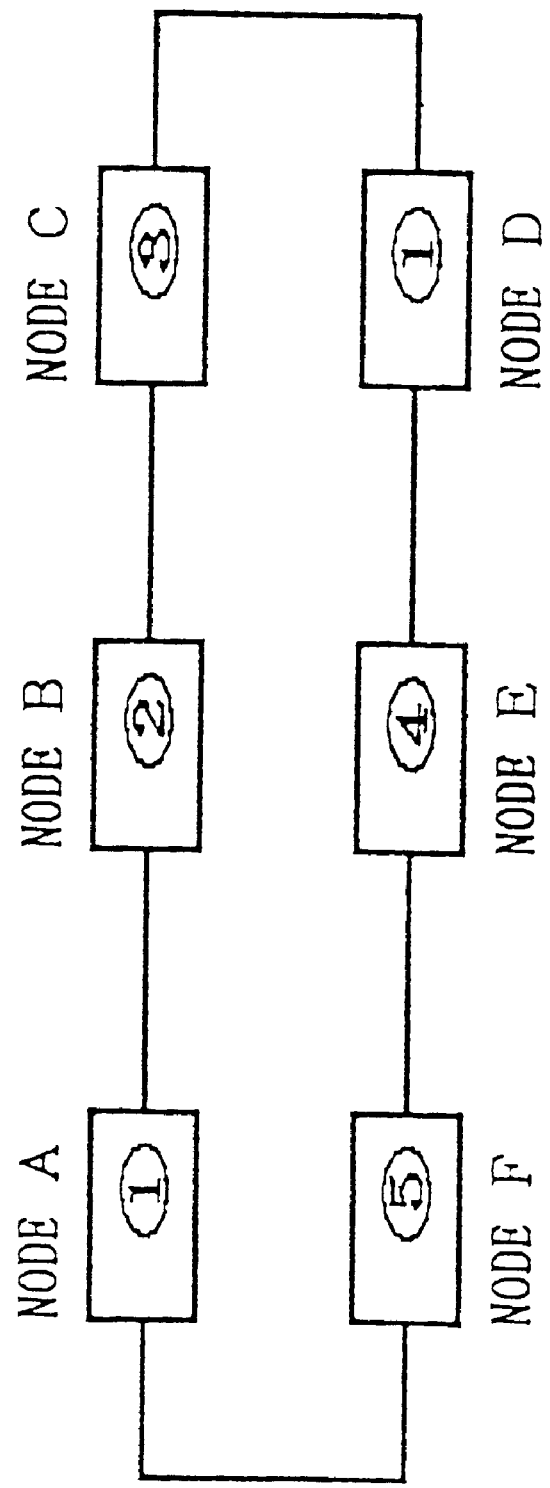
FIG. 5 shows a communication network in which two nodes having the smallest identifier are present.

FIG. 5 shows a communication network in which two nodes, each having the smallest identifier, are present. Two nodes (NODE A and NODE D) each having the smallest identifier (1) are present in the communication network. When the above-described ring topology table creating process is used for this communication network, a frame starting from node A and having an identifier arrangement of (1)-(2)-(3), and a frame starting from node D and having an identifier arrangement of (1)-(4)-(5) exist in this network. In short, two kinds of constant frame, in which the smallest identifiers (1) are stored at the first byte, are present in the network. According to the above-described identifier duplication detecting process, when a node monitors these two kinds of frame, an alarm is sounded. This enables the duplication of the smallest identifiers in the network to be detected.

Figure 6:
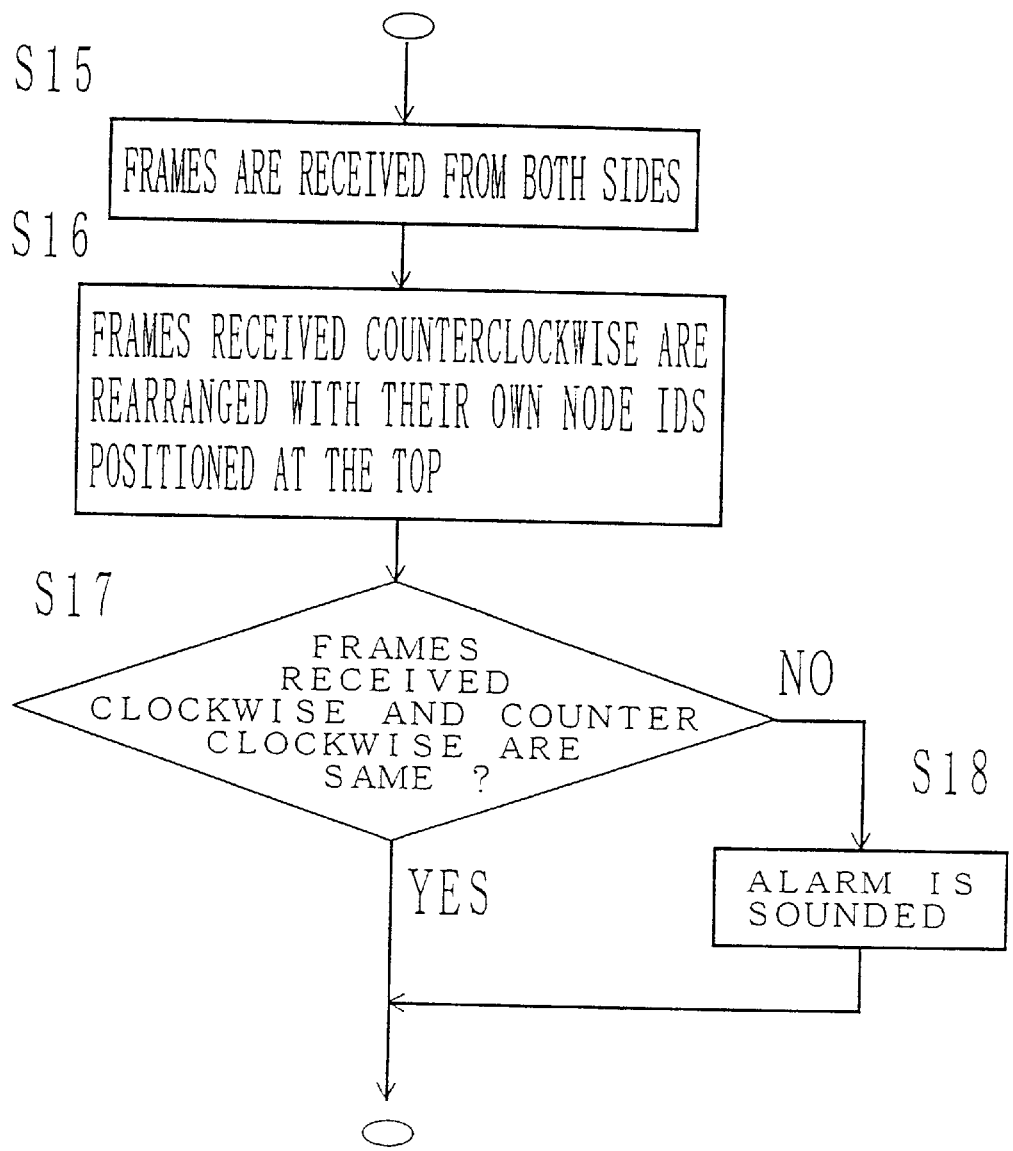
FIG. 6 is a flow chart showing another node duplication detecting process.

FIG. 6 is a flow chart showing an identifier duplication detecting process different from the one shown in FIG. 4. The process shown in FIG. 6 is applied to a case where the ring topology table creating process is carried out to make both clockwise and counter-clockwise constant frames. The node duplication detecting process is conducted in this case by comparing frames transmitted and received clockwise and counter-clockwise.

As shown in FIG. 6, each node receives frames from left-adjacent node and right-adjacent node (step S15) and re-arranges identifiers stored in the received frame rounding counter-clockwise in the network so that its own node identifier is stored at the front byte (step S16). Then each node checks whether or not the arrangement of identifiers is the same in the clockwise received frame and counterclockwise received frame (step S17). When they are different (step S17, NO), an alarm is sounded indicating that the identifiers are different (step S18), and when they are the same (step S17, YES), the node duplication detecting process is finished without doing anything.

A second embodiment of the present invention will be described referring to FIGS. 7 through 15. In this embodiment, source and destination nodes on lines of a communication network, which includes a plurality of nodes in a ring form, are detected to create a line information table in which this information thus detected is stored as line information.

Figure 7:
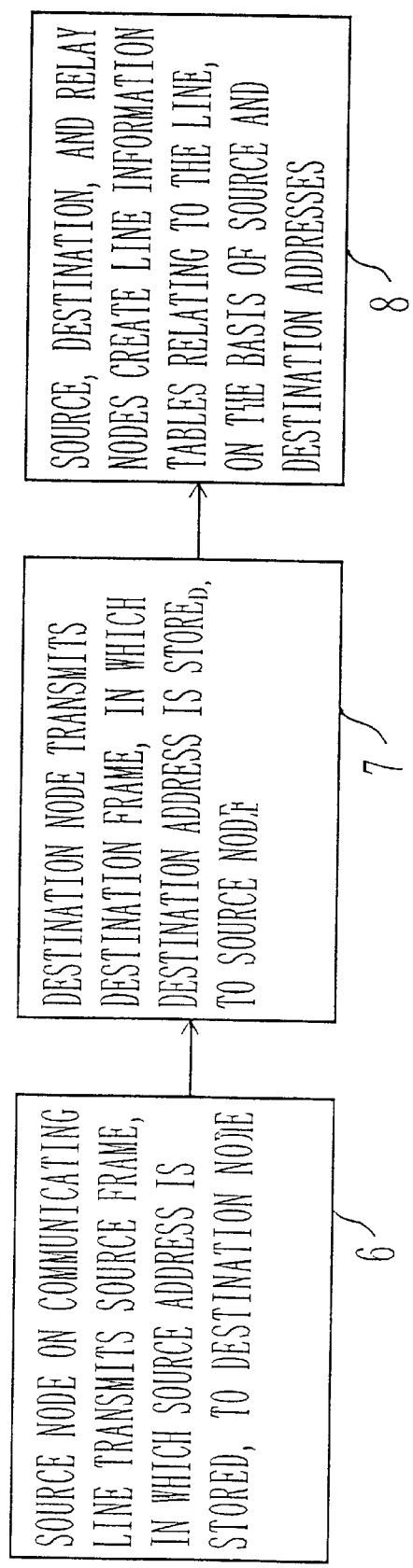
FIG. 7 is a block diagram showing the line information table creating method according to a second embodiment of the present invention.

FIG. 7 is a block diagram showing the line information table creating method according to the second embodiment of the present invention. According to the method, a source node on a communication line being made transmits a source frame, in which a source address of the source node is stored, to a destination node, as shown in block 6. This source address may be stored at, for example, surplus bits of the frame used for the communication.

As shown in block 7 in FIG. 7, a destination node sends a destination frame, in which a destination address of the destination node is stored, to a source node. This destination address may also be stored at surplus bits of the frame.

As shown in block 8, source and destination nodes and relay nodes, arranged between these two nodes on lines, create line information tables, in which information of the source and destination nodes on the lines is stored as line information, on the bases of the source address stored in the source frame and the destination address stored in the destination frame.

Figure 8:
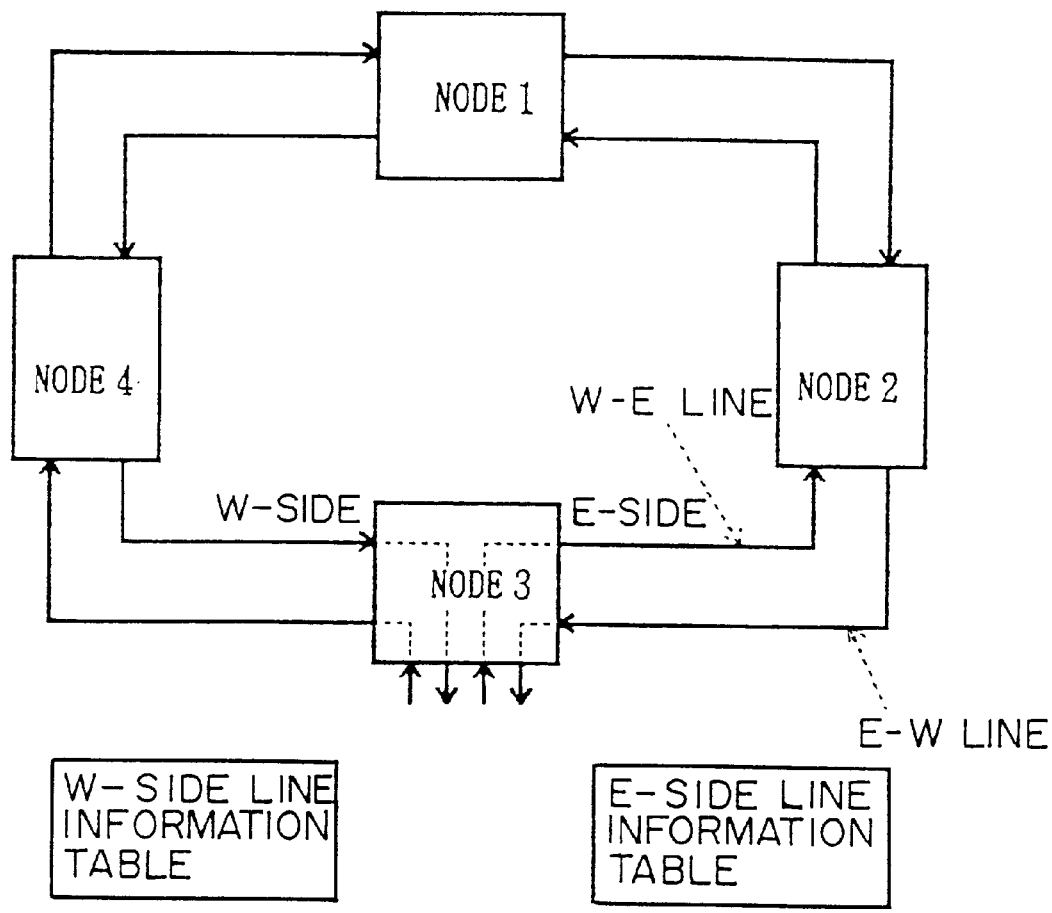
FIG. 8 shows a concept of the line information table creating method according to the second embodiment of the present invention.

FIG. 8 shows a concept of the line information table creating method according to the second embodiment of the present invention. In a communication network shown in FIG. 8, nodes 1–4 are connected to one another by an E-W line through which information is transmitted clockwise and by a W-E line through which information is transmitted counter-clockwise. Node 3 is drop-set relative to the E-W line on a side E and is a destination for node 2 on the E-W line. It is also add-set relative to the E-W line on a side W and is a destination for node 4 on the E-W line.

It will be described how the contents of a W-side line information table, which is a line information table of node 3 for the E-W line extending from node 3 to node 4, are set. As described above, this channel is add-set at node 3. Node 3, therefore, registers its own node identifier (identifier indicating node 3) or address on the W-side line information table as an E-W direction source identifier (or address). Further, node 3 stores its own node identifier in an E-W source frame, which will be described later, as a source identifier and sends the frame to node 4. Furthermore, node 3 picks up a destination identifier (or destination address) from an E-W destination frame received from node 4 through the W-E line, for example, and registers the identifier, thus picked up, on the W-side line information table as an E-W destination identifier.

It will be described how the contents of an E-side line information table, which is a line information table of node 3 for the E-W line extending from node 2 to node 3, are set. As described above, this channel is drop-set at node 3. The node 3, therefore, registers its own node identifier on the E-side line information table as an E-W direction destination identifier. Further, node 3 stores its own node identifier in an E-W destination frame, which is sent to node 2 through the W-E line, as a destination identifier. Furthermore, node 3 picks up a source identifier from an E-W source frame sent from node 2 and registers the identifier thus picked up on the E-side line information table as an E-W source identifier.

According to the above-described method, line information tables relating to a signal in the E-W direction can be created at both source and destination stations. When the same process is conducted, line information tables, which represent all line information at node 3, can also be created relating to a signal in the W-E direction.

FIG. 9 shows how source and destination addresses (or identifiers) are stored in source and destination frames. In FIG. 9, frames of channels 1–n are shown and source and destination address fields in these frames are also shown. Eight (8) bits are allotted to each of the source and destination addresses in each frame. "TX side" in this figure denotes a transmission side and "RX side" a reception side. Source and destination frames have no difference as a frame.

Four kinds of E-W source and destination frames and W-E source and destination frames can be cited as these source and destination frames. E-W source and W-E destination frames are sent through the clockwise E-W line and E-W destination and W-E source frames through the counter-clockwise W-E line. For these frames, each node can be through-set only for relay, add-set as a source node, or drop-set as a destination node, according to communication circumstances. While storing identifiers in these frames or picking them up from these frames, each node recognizes source and destination identifiers relating to all channels in all lines, thereby creating line information tables.

Figure 10:
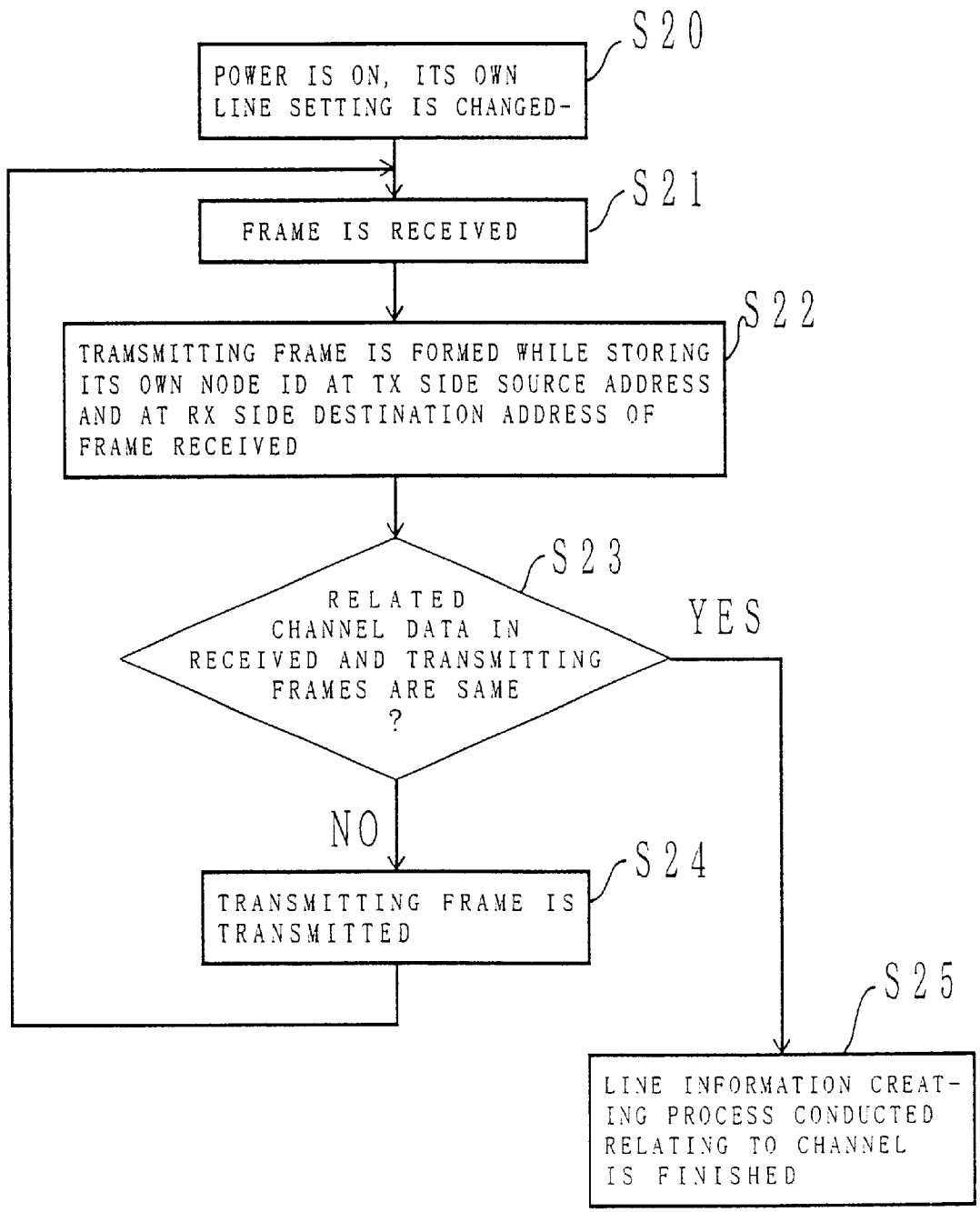
FIG. 10 is a flow chart showing the line information table creating process at an add- or drop-set node.

FIG. 10 is a flow chart showing the line information table creating process relating to a line on which the then-targeted node is add-set or drop-set. The flow chart shows the process conducted in a clockwise direction on the line, but same process can be conducted in a counter-clockwise direction on the line.

When power is turned on or when the process is started by whatever means, the line setting of the then-targeted node is changed (step S20). The storing of line information, which is apparent at the then-targeted node, in the line information table, for example, is carried out at this step. Frames are then received through the network (step S21) and a transmitted frame, which is formed by storing the then-targeted node identifier at source and destination addresses of TX-side and RX-side frames of those frames which have been received, is created (step S22).

Data of a related channel in this transmitted frame thus created, and in the received frames, are compared (step S23) and when they are not the same, the transmitted frame is transmitted (step S24) and the process goes back to step S21. When they are the same, it is judged that the creation of the line information table for the related channel has been completed, and the process is thus finished (step S25). The process at steps S22 and S23 will be described later.

Figure 11:
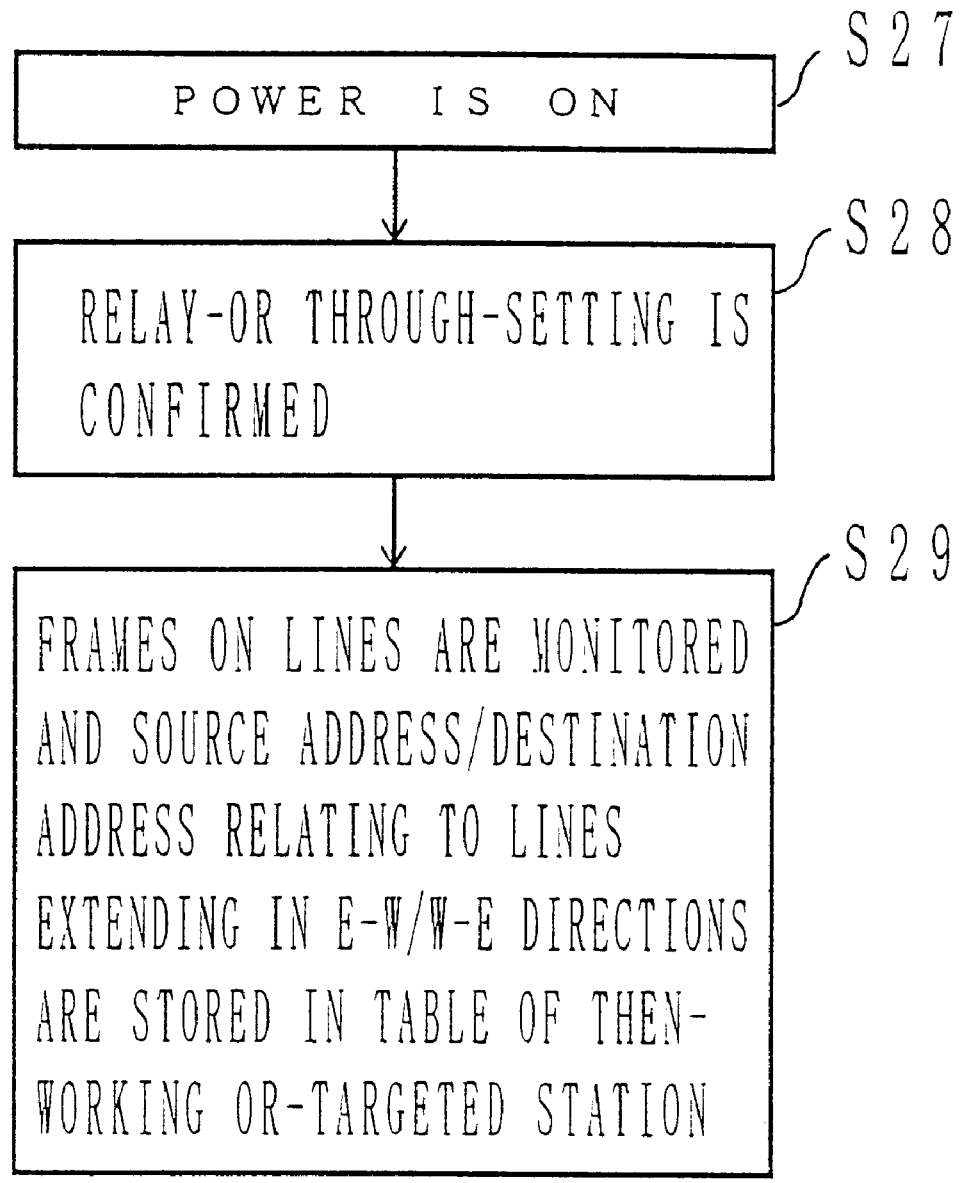
FIG. 11 is a flow chart showing the line information table creating process at a relay node.

FIG. 11 is a flow chart showing the line information table creating process conducted in a case where the then-targeted node is a relay node or through-set for a line of the communication network. When the process is started by turning on the power (step S27), it is confirmed that the then-targeted node is through-set (step S28). Thereafter, frames on lines are monitored, and source and destination addresses for the lines are extracted and stored in the line information table of the then-targeted node (step S29).

Figures 12A, 12B, 12C:
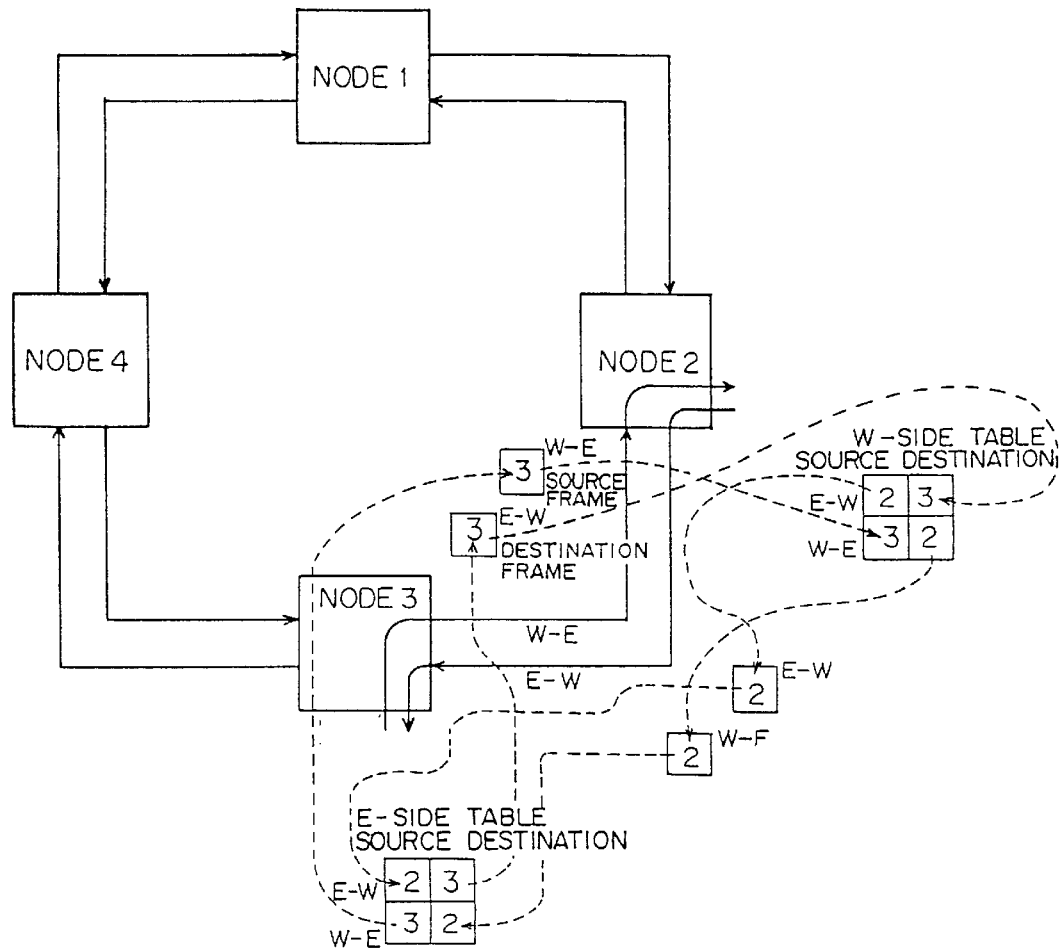
FIGS. 12A–12C show the line information table creating process in more detail.

FIGS. 12A through 12C explain the line information table creating process in more detail. FIG. 12A shows a network to which the line information table creating process is applied, FIG. 12B E-W frame TX (E-W) and W-E frame RX (W-E), which are sent from node 2 to node 3, and FIG. 12C E-W frame TX (E-W) and W-E frame RX (W-E), which are returned from node 2 to node 3. Referring to FIGS. 12A through 12C, the line information table creating method on the W-side of node 2 and on the E-side of node 3 will be described.

As shown in FIG. 12A, node 2 is add-set relating to the E-W line. In other words, node 2 is a source node. Therefore, it stores its own node identifier in its W-side table as a source identifier. Node 2 is also drop-set relating to the W-E line. In other words, node 2 is a destination node. Therefore, node 2 stores its own node identifier in its W-side table as a destination identifier. Node 2 then stores its own node identifier at a source address of the E-W frame TX (E-W) and at a destination address of the W-E frame RX (W-E) and sends these frames to node 3.

Node 3 receives these frames and stores the source identifier of the E-W frame TX (E-W) in an E-side table of node 3 as a source identifier for the E-W line and the destination identifier of the W-E frame RX (W-E) in the E-side table as a destination identifier for the W-E line. Node 3 is a destination node relating to the E-W line and also a source node relating to the W-E line. Therefore, node 3 stores its own node identifier at a destination address of the E-W frame TX (E-W) and at a source address of the W-E frame RX (W-E) and sends these frames to node 2. Node 2 receives these frames and stores the destination identifier of the E-W frame TX (E-W) in the W-side table of its own node as a destination identifier for the E-W line and the source identifier of the W-E frame RX (W-E) in the W-side table as a source identifier for the W-E line.

Frames shown in FIG. 12C correspond to frames received at step S21, shown in FIG. 10. After node 2 receives these frames, node 2 store its own node identifier in the received frames and send them to node 3 at step S22. At the step S23, node 3 confirms that data on the frames which are to be sent to node 3 are the same as those on the received frames, and the line information table creating process relating to this channel is finished.

Figure 13:
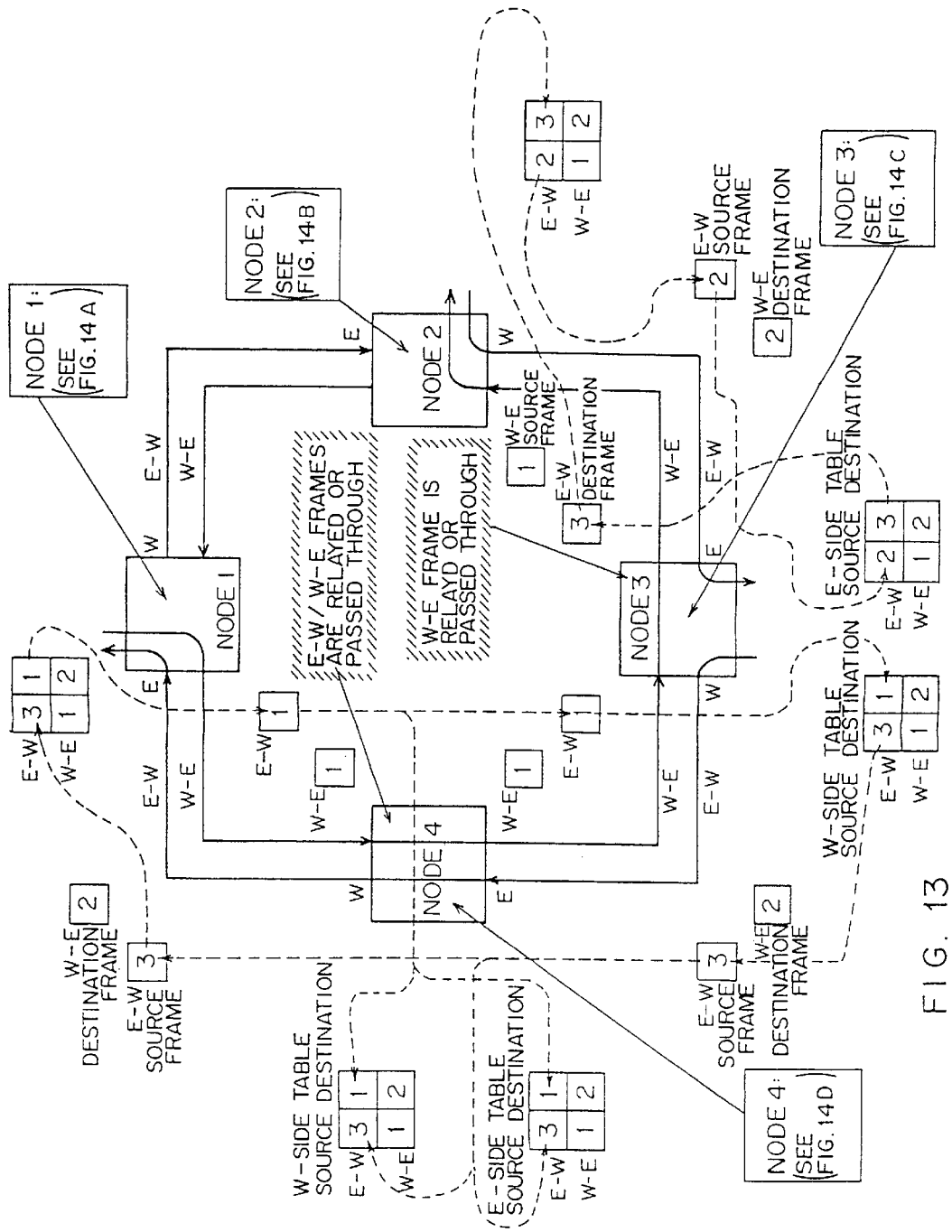
FIG. 13 shows the line information table creating process in a network different from the one shown in FIGS. 12A–12C.

Referring to FIGS. 12A–12C, the line information table creating process has been described in the case where signal transmission sections of both ways are the same between nodes 2 and 3. In common communication networks, however, it is often seen that those sections are not the same. It is also often seen that nodes on the signal transmission section serve as neither source nor destination ones but only signal relays for the line. FIG. 13 shows a line information table creating process suitable for these cases.

In the network shown in FIG. 13, node 1 serves as a source node, nodes 4 and 3 serve as relay nodes, and node 2 serves as a destination node relating to the W-E line. On the other hand, the E-W line includes a line extending from node 2 to node 3 and a line extending from node 3 to node 1 through node 4. The line information table creating process at each node, shown in FIG. 13, is shown in FIG. 14. The line information table creating process at each node for the E-W line in the network, will be described below.

Signal transmission and reception are not conducted on the W-side of node 1. Therefore, the line information table is created only on the E-side of node 1. A source identifier "3" is picked up from an E-W source frame sent from 4 and stored in the E-side line information table as a source identifier in the E-W direction. Node 1 serves as a destination node relating to the E-W line. Therefore, node 1 stores its own node identifier in the E-side information table as a destination identifier in the E-W direction, inserts its identifier into an E-W destination frame, and sends it to node 4.

Data transmission and reception are not conducted on the E-side of node 2. Therefore, the table is created only on the W-side of node 2. Node 2 serves as a source node relating to the E-W line. Therefore, it stores its own node identifier in the W-side table as a source identifier in the E-W direction. Further, node 2 inserts its own node identifier into an E-W source frame and sends it to node 3. Furthermore, node 2 picks up a destination identifier "3" from an E-W destination frame sent from node 3 and stores it in the W-side table as a destination identifier in the E-W direction.

Node 3 serves only as a relay node relating to the W-E line, is drop-set relating to the E-W line extending from node 2, and is add-set relating to the E-W line extending to node 4. Therefore, both tables are created on the E-side and W-side of node 3. On the E-side of node 3, a source identifier "2" is picked up from an E-W source frame sent from node 2 through the E-W line and is stored in the E-side table as a source identifier in the E-W direction. Further, node 3 stores its own node identifier in the E-side table as a destination identifier in the E-W direction, inserts its identifier into the E-W destination frame, and sends it to node 2. On its W-side, node 3 stores its own node identifier in the W-side table as an identifier in the E-W direction, inserts its identifier into the E-W source frame, and sends it to node 4. Node 3 picks up destination identifier "1" is picked up from the E-W destination frame sent from node 4 and stores it in the W-side table as a destination identifier in the E-W direction.

Node 4 is through-set relating to both E-W and WE lines and serves only as a relay node. On the Eside of node 4, source identifier "3" is picked up from the E-W source frame sent from node 3 through the E-W line and stored in the table as a source identifier in the E-W direction. Further, the destination identifier "1" is picked up from the E-W destination frame sent from node 1 through the W-E line and stored in the table as a destination identifier in the E-W direction. Another table is also created on the W-side of node 4 in the same manner.

Figure 15:
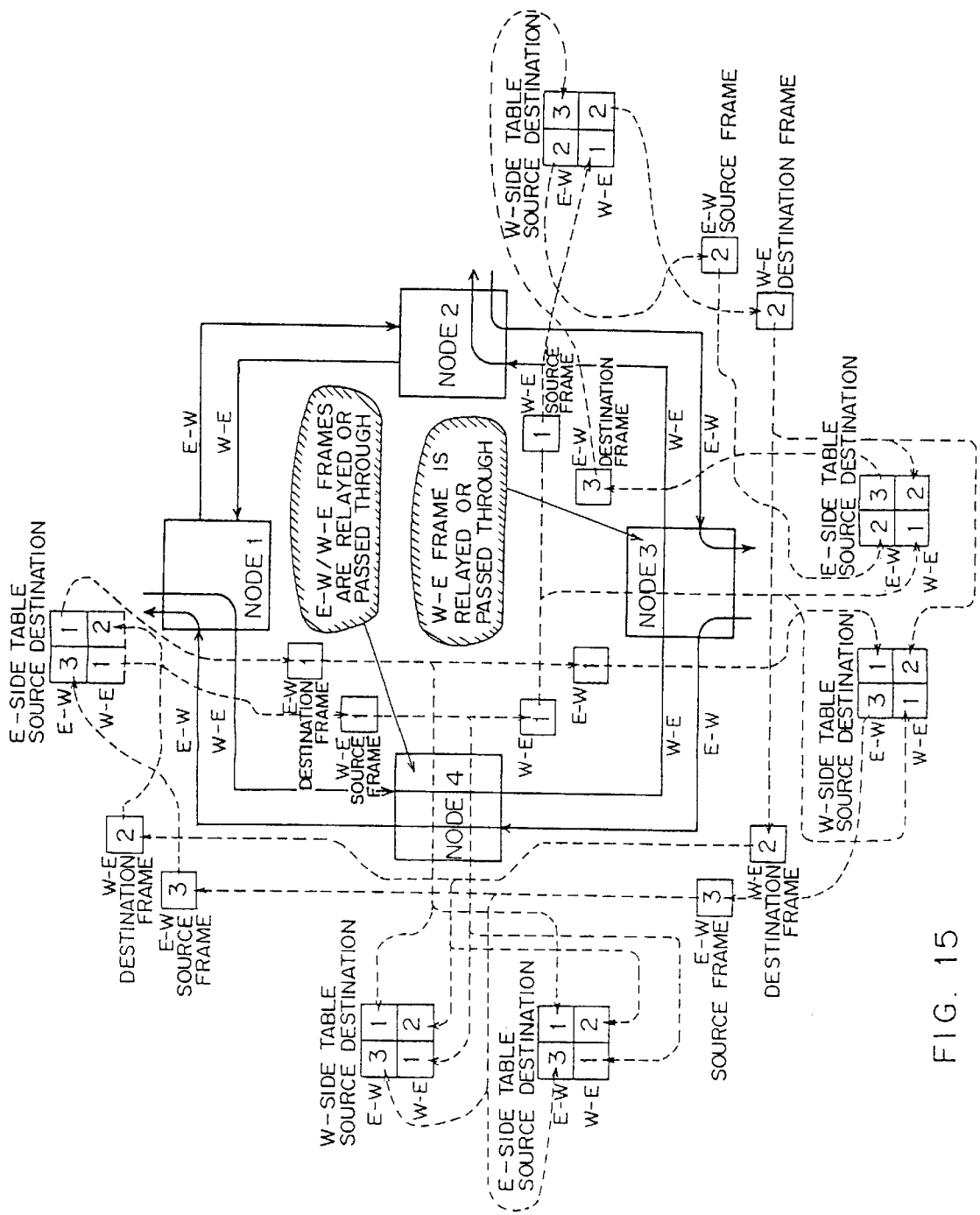
FIG. 15 shows results obtained by the line information table creating process in the network shown in FIG. 13.

The table creating process at each node for the W-E line in the network is also conducted in the same manner as described above. FIG. 15 shows results of the information tables creating process for the W-E line in the network.

Although the line information table creating process has been described for only one channel, it may be applied to every channel, independently, in a case where a plurality of channels is used in a communication network. These channels have no interrelation with one another.

Figure 16A:
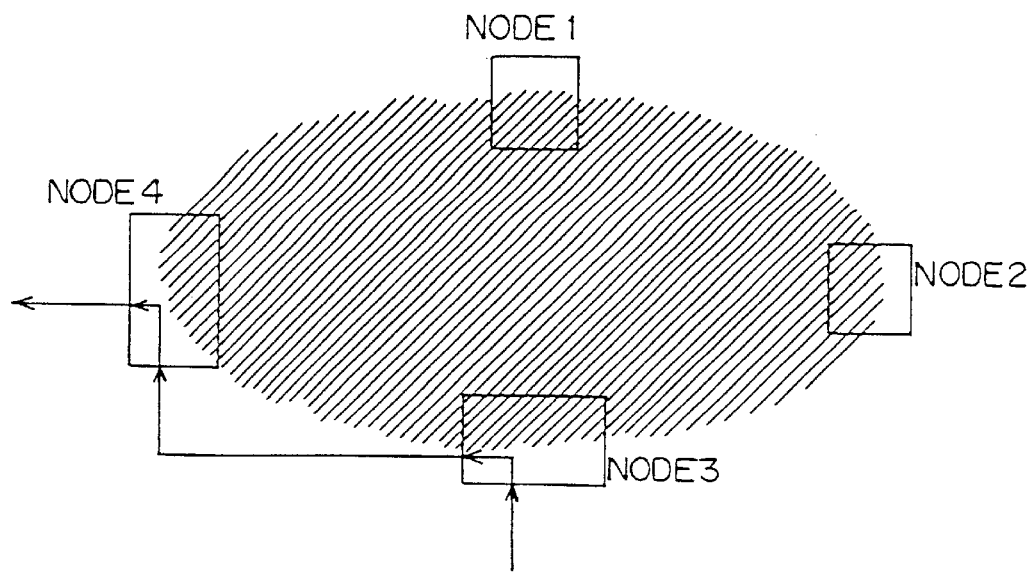
FIGS. 16A and 16B show how the ring topology table is used when trouble occurs in the communication line.
Figure 16B:
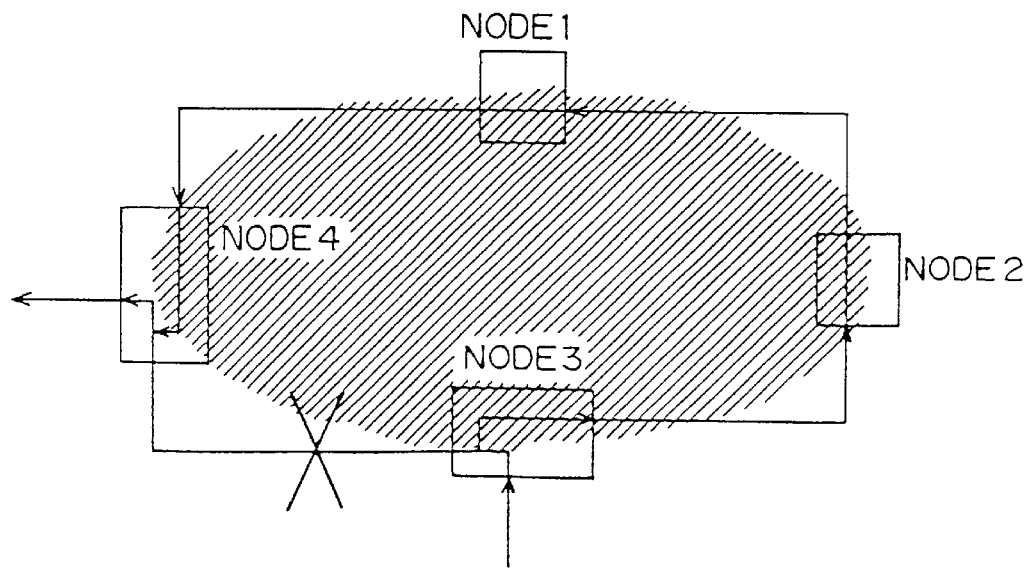

The topology table creating process, which is intended to show the node configuration of a network, and the line information table creating process, which is intended to show information of source and destination nodes in a channel, have been described above as first and second embodiments of the present invention. According to the present invention, these tables can be created automatically, and contents of these created tables can be used as information in the network. In addition, they can be useful particularly if trouble is caused in the network. Referring to FIGS. 16A and 16B, it will be described how the ring topology table is used when trouble occurs, and it will also be described how the line information table is used at the time of a plurality of troubles, referring to FIGS. 17A and 17B.

When a line in a network having a line extending from node 3 to node 4 is broken, as shown in FIG. 16A, " " information showing the break is sent to node 3, which detects that the line has been broken. As shown in FIG. 16B, the line is repaired using another line extending from node 3 to node 4 via nodes 2 and 1. This detection of the broken point of the line can be attained on the basis of the above-described ring topology table. It can also be realized, on the basis of the ring topology table, which nodes are to be used to repair the broken line.

Figure 17A:
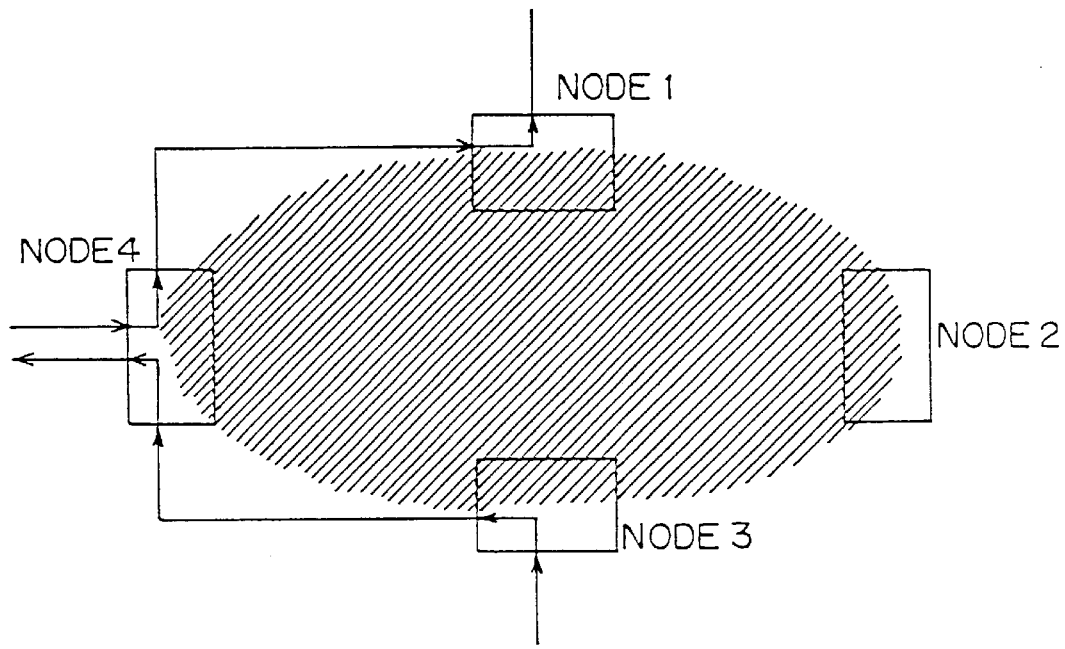
FIGS. 17A and 17B show how the line information table is used when trouble occurs in the communication line.
Figure 17B:
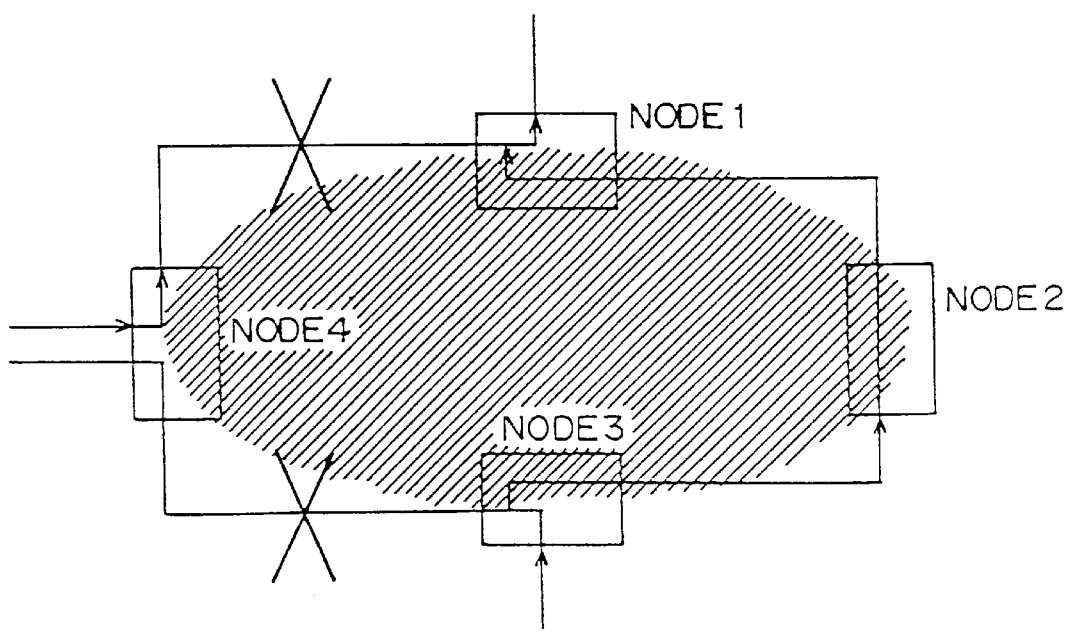

In a network including a line extending from node 3 to node 4 and another line extending from node 4 to node 1, as shown in FIG. 17A, if both of these lines are broken, a repair line extending from the node 3 to node 1 via node 2 may be used. This repair line, however, does not recover communication from node 4 to node 1. This means that this line is wrongly connected to node 1. From the contents of the line information table, however, node 1 can deduce that the signal received by it has to have been sent from node 4. Therefore, node 1 can recognize that the network has been broken at two points and that the repair line is wrongly connected to node 1. Accordingly, an alarm can be sounded to eliminate the wrongly-connected state.

According to the present invention as described above, the arrangement of nodes in a network can be automatically recognized. In addition, source and destination nodes on a line can also be automatically recognized. When line repairing is necessary to overcome troubles and the repairing line is wrongly connected to nodes, correct node arrangement and line configuration can be automatically provided.

What is claimed is:

1. A method of detecting a network configuration of a communication network including the steps of:

inserting, in a node of a plurality of nodes, a node identifier at a specific position of an identifier storing area of a frame and transmitting said frame;

inserting in each of the plurality of nodes, a node identifier in the identifier storing area of said frame and again transmitting said frame in said direction, and abandoning said frame, according to contents of the identifier storing area of said frame received from an adjacent node; and by each of the plurality of nodes, each node recognizing arrangement of the plurality of nodes on the communication network, on the basis of said contents of said frame constantly transmitted and received on the communication network.

2. The method according to claim 1, wherein said specific position is in a leading portion of said identifier storing area.

3. The method according to claim 1, further comprising, transmitting said frame without storing an identifier in said frame and without canceling said frame when said frame includes an identifier indicating a certain node.

4. The method according to claim 1, wherein when said frame received from the adjacent node does not include an identifier indicating a certain node and an identifier stored at the specific position of the identifier storing area of said frame is smaller than said identifier indicating said certain node, said identifier indicating said certain node is stored at a second specific position of the identifier storing area of said frame and again transmitted toward a next node.

5. The method according to claim 4, wherein said second specific position of the identifier storing area is the next position of the specific position of said area.

6. The method according to claim 1, wherein when said frame received from the adjacent node does not include an identifier indicating a certain node and an identifier stored at the specific position of the identifier storing area of said frame is larger than said identifier indicating said certain node is stored at a second specific position of the identifier storing area of said frame and again transmitted toward a next node.

7. The method according to claim 6, wherein said second specific position of the identifier storing area is the next position of the specific position of the identifier storing area.

8. The method according to claim 1, further comprising:

monitoring contents of the identifier storing areas of frames transmitted in a direction, and determining at least two nodes having the same identifier exist on the communication network when contents of the identifier storing areas of said frames are different from each other.

9. A method for detecting a network configuration of a communication network including a plurality of nodes connected in a ring form, comprising:

inserting at a specific position in a frame a first node identifier indicating a first node in the communication network and transmitting said frame in a direction along the communication network;

inserting a second node identifier indicating a second node in the communication network in said frame received from said first node and transmitting said frame in said direction; and recognizing the arrangement of said plurality of nodes on the communication network on the basis of an arrangement of identifiers inserted into said frame.

10. A method for detecting a network configuration of a communication network including a plurality of nodes connected in a ring form, comprising:

inserting at a specific position of an identifier storing area of a frame a node identifier, indicating a node in the communication network, and transmitting said frame along the communication network;

receiving said frame from an adjacent node and depending upon contents of said frame performing one of a process of inserting a node identifier in said identifier storing area of said frame and again transmitting said frame and a process of abandoning said frame; and storing area of said frame and again transmitting said frame and a process of abandoning said frame; and recognizing an arrangement of the plurality of nodes on the communication network on the basis of contents of said identifier storing area of said frame.

\* \* \* \* \*